May 10, 1932.  B. H. OLIVER  1,857,563
SAW SET
Filed April 6, 1931   2 Sheets-Sheet 1

Inventor

Benjamin H. Oliver

By Clarence A. O'Brien
Attorney

May 10, 1932.  B. H. OLIVER  1,857,563
SAW SET
Filed April 6, 1931  2 Sheets-Sheet 2
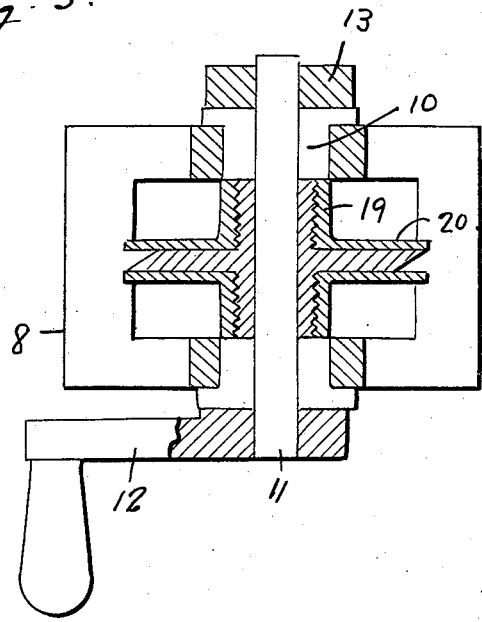
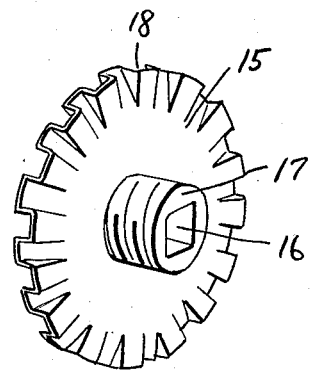
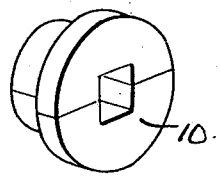
Inventor
Benjamin H. Oliver
By Clarence A O'Brien
Attorney Patented May 10, 1932

1,857,563

UNITED STATES PATENT OFFICE

BENJAMIN H. OLIVER, OF OSHOTO, WYOMING

SAW SET

Application filed April 6, 1931. Serial No. 528,163.

This invention relates to a saw set, the general object of the invention being to provide means whereby a saw can be easily and quickly set through means of a pair of holding plates for the saw and between which the saw is placed and a carriage slidably arranged on the plate and carrying a saw set wheel which when rotated will cause the carriage to move along the plate and bring portions of the wheel into engagement with the teeth of the saw to set the same.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 3 is a top plan view, with parts in section, and the setting roller or wheel and its associated parts.

Figure 4 is a perspective view of the wheel.

Figure 5 is a view of one of the bearings.

Figure 1:
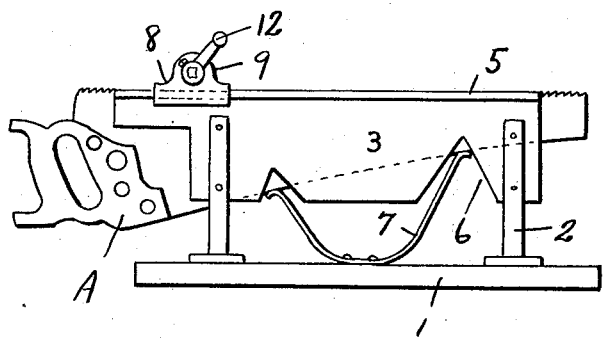
Figure 1 is a side elevation of the device.
Figure 2:
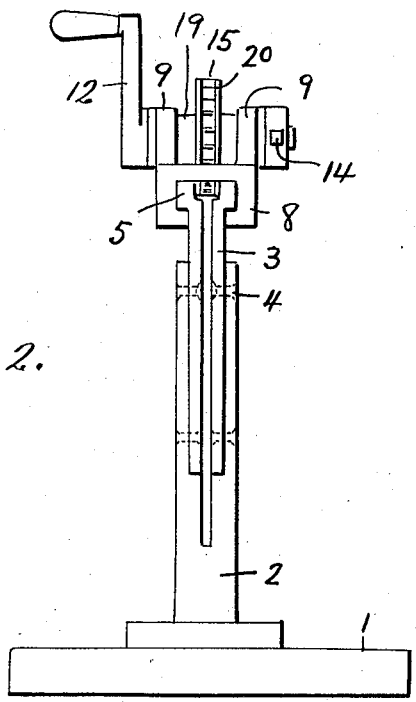
Figure 2 is an end view thereof.

In these drawings, the numeral 1 indicates the base of the device and the numeral 2 indicates a pair of uprights fastened to the base and having their upper portions forked to receive the two plates 3 which are fastened to the uprights as shown at 4. Each plate has an outwardly extending flange 5 at its upper edge and the plates are spaced apart so that a saw such as shown at A can be placed between the plates. The lower portion of each plate is formed with the V-shaped notches 6 for exposing portions of the saw so that these portions can be engaged by a substantially U-shaped spring 7 which is fastened to the base and has its end curved to engage the rear edge of the saw as clearly shown in Figure 1.

A substantially channel shaped frame or carriage 8 is adapted to be placed over the flanged upper edges of the two plates 3 with the flanges of the frame 8 bent inwardly to engage the under edges of the flanges 5 to hold the frame on the plate. The sides of this frame are formed with the upwardly extending portions 9 which have circular openings therein to receive the flanged bearing members 10 through which the shaft 11 passes. A handle 12 is connected to one end of the shaft and a collar 13 is connected to the other end by a set screw 14 so that by removing the set screw and pulling off the collar the shaft can be removed. A wheel 15 has a square opening 16 in its hub 17 for receiving a square part of the shaft and the periphery of this wheel is corrugated as shown at 18 to form the teeth engaging parts which act to set the teeth of the saw. Each corrugation is of square shape in cross section as shown in Figure 4.

The hub is exteriorly threaded to receive the hubs 19 of the disks 20 which engage the faces of the wheel 15 as shown in Figure 3. These disks acting to close the open sides of the corrugations as shown in Figure 3.

It will of course be understood that a number of these wheels must be furnished with the device, so the device can be used for setting saws of different sizes.

From the foregoing it will be seen that as the wheel is rotated the teeth of the saw will be engaged between the sloping faces of the corrugations and the disks so that all the teeth will be set accurately and to the same degree and with this device the saw teeth can be set with great speed. As the carriage 8 is placed on the flanged upper edges of the plate 8, the plates are pressed toward each other so as to frictionally engage the saw and this with the spring 7 acts to prevent the saw from moving downwardly as its teeth are engaged by the setting wheel. The carriage is moved along the upper portion of the plate 3, and during this movement the wheel will engage the teeth and set the same, the resistance offered by the teeth to the movement of the wheel as its shaft is turned by the handle 12 to cause the bearings to move along the upper parts of the plates 3.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention what I claim as new is:

1. A saw setting device comprising a support, a pair of vertically arranged plates supported in spaced relation by said support and adapted to receive a saw between them, the upper ends of the plates having outwardly extending flanges thereon, a frame slidably arranged on the upper edges of the plates and engaging the flanges, a shaft rotatably arranged in the second frame, a saw setting wheel connected with the shaft and having a hub extending outwardly from each side thereof, a pair of disks between which the wheel is arranged, means for detachably connecting the disks to said hub and a spring attached to the support and engaging the rear edge of the saw.

2. A saw setting device comprising a base, forked uprights on the base, a pair of spaced plates extending between the prongs of the fork and fastened thereto in spaced relation for receiving a saw between them, the upper edges of the plates having outwardly extending flanges thereon, a frame slidably arranged on the upper edges of the plate and having portions engaging the flanges, a shaft rotatably arranged in the second frame, a handle on the shaft, a setting wheel having a hub extending outwardly on each side thereof, said hub being fastened to the shaft, a pair of disks on said hub and between which the wheel is located, the periphery of the wheel being corrugated with each corrugation having a sloping tooth engaging portion with said sloping portion alternately arranged, a spring on the base, said spring being of U-shape with the ends of its limbs engaging the rear edge of a saw.

In testimony whereof I affix my signature.

BENJAMIN H. OLIVER.